US006465979B1

(12) United States Patent
Leijon et al.

(10) Patent No.: US 6,465,979 B1
(45) Date of Patent: Oct. 15, 2002

(54) SERIES COMPENSATION OF ELECTRIC ALTERNATING CURRENT MACHINES

(75) Inventors: Mats Leijon; Lars Gertmar; Jan-Anders Nygren; Peter Templin, all of Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/355,852

(22) PCT Filed: Feb. 2, 1998

(86) PCT No.: PCT/SE98/00162

§ 371 (c)(1),
(2), (4) Date: Oct. 4, 1999

(87) PCT Pub. No.: WO98/34315

PCT Pub. Date: Aug. 6, 1998

(30) Foreign Application Priority Data

Feb. 3, 1997 (SE) ................................................ 9700348
Nov. 28, 1997 (SE) ................................................ 9704421

(51) Int. Cl.[7] .......................... H02J 3/18; H02K 11/00; H02K 3/40
(52) U.S. Cl. ..................... 318/438; 318/148; 307/149; 361/47; 361/48; 174/DIG. 15
(58) Field of Search ................................ 318/438, 565, 318/568.22, 621, 632, 722, 729, 801, 140, 148; 174/115, 116, DIG. 13–DIG. 33; 361/42, 47, 48, 90, 91.1; 307/149, 151, 153

(56) References Cited

U.S. PATENT DOCUMENTS

| 681,800 A | 9/1901 | Lasche |
|---|---|---|
| 847,008 A | 3/1907 | Kitsee |
| 1,304,451 A | 5/1919 | Burnham |

(List continued on next page.)

FOREIGN PATENT DOCUMENTS

| AT | 399790 | 7/1995 |
|---|---|---|
| BE | 565063 | 2/1957 |
| CH | 391071 | 4/1965 |
| CH | 266037 | 10/1965 |
| CH | 534448 | 2/1973 |

(List continued on next page.)

OTHER PUBLICATIONS

ABB Elkrathandbok, ABB Distribution AB, ISBN 91–970956–2–1, Jordningssystem, See pp. 274–276 No Date.
Shipboard Electrical Insulation; G. L. Moses, 1951, pp. 2&3.
Elkraft teknisk Handbok, 2 Elmaskiner; A. Alfredsson et al; 1988, pp. 121–123.
High Voltage Cables in a New Class of Generators Power-former; M. Leijon et al; Jun. 14, 1999; pp. 1–8.
Ohne Tranformator direkt ins Netz; Owman et al, ABB, AB; Feb. 8, 1999; pp. 48–51.
Submersible Motors and Wet–Rotor Motors for Centrifugal Pumps Submerged in the Fluid Handled; K.. Bienick, KSB; Feb. 25, 1988; pp. 9–17.
High Voltage Generators; G. Beschastnov et al; 1977; vol. 48. No. 6 pp. 1–7.

(List continued on next page.)

Primary Examiner—Bentsu Ro
(74) Attorney, Agent, or Firm—Oblon, Spivak, McClelland, Maier & Neustadt, P.C.

(57) ABSTRACT

A method and device for providing series compensation for rotating electric alternating current machines connected either directly, or via a static current converter, to a three-phase distribution or transmission network. The stator of the electric machine is Y-connected. A capacitive circuit for the fundamental frequency of the voltage is connected to each phase between the low voltage side of the winding and a ground of the transmission network.

16 Claims, 1 Drawing Sheet

U.S. PATENT DOCUMENTS

| | | | |
|---|---|---|---|
| 1,418,856 A | 6/1922 | Williamson | |
| 1,481,585 A | 1/1924 | Beard | |
| 1,508,456 A | 9/1924 | Lenz | |
| 1,728,915 A | 9/1929 | Blankenship et al. | |
| 1,742,985 A | 1/1930 | Burnham | |
| 1,747,507 A | 2/1930 | George | |
| 1,756,672 A | 4/1930 | Barr | |
| 1,762,775 A | 6/1930 | Ganz | |
| 1,781,308 A | 11/1930 | Vos | |
| 1,861,182 A | 5/1932 | Hendey et al. | |
| 1,904,885 A | 4/1933 | Seeley | |
| 1,974,406 A | 9/1934 | Apple et al. | |
| 1,976,581 A * | 10/1934 | Rose | |
| 2,006,170 A | 6/1935 | Juhlin | |
| 2,008,515 A * | 7/1935 | Plathner et al. | |
| 2,206,856 A | 7/1940 | Shearer | |
| 2,212,963 A * | 8/1940 | Wahlquist | |
| 2,217,430 A | 10/1940 | Baudry | |
| 2,241,832 A | 5/1941 | Wahlquist | |
| 2,251,291 A | 8/1941 | Reichelt | |
| 2,256,897 A | 9/1941 | Davidson et al. | |
| 2,295,415 A | 9/1942 | Monroe | |
| 2,409,893 A | 10/1946 | Pendleton et al. | |
| 2,415,652 A | 2/1947 | Norton | |
| 2,424,443 A | 7/1947 | Evans | |
| 2,436,306 A | 2/1948 | Johnson | |
| 2,446,999 A | 8/1948 | Camilli | |
| 2,459,322 A | 1/1949 | Johnston | |
| 2,462,651 A | 2/1949 | Lord | |
| 2,498,238 A | 2/1950 | Berberich et al. | |
| 2,650,350 A | 8/1953 | Heath | |
| 2,721,905 A | 10/1955 | Monroe | |
| 2,749,456 A | 6/1956 | Luenberger | |
| 2,780,771 A | 2/1957 | Lee | |
| 2,846,599 A | 8/1958 | McAdam | |
| 2,885,581 A | 5/1959 | Pileggi | |
| 2,943,242 A | 6/1960 | Schaschl et al. | |
| 2,947,957 A | 8/1960 | Spindler | |
| 2,959,699 A | 11/1960 | Smith et al. | |
| 2,962,679 A | 11/1960 | Stratton | |
| 2,975,309 A | 3/1961 | Seidner | |
| 3,014,139 A | 12/1961 | Shildneck | |
| 3,098,893 A | 7/1963 | Pringle et al. | |
| 3,130,335 A | 4/1964 | Rejda | |
| 3,143,269 A | 8/1964 | Van Eldik | |
| 3,157,806 A | 11/1964 | Wiedemann | |
| 3,158,770 A | 11/1964 | Coggeshall et al. | |
| 3,197,723 A | 7/1965 | Dortort | |
| 3,268,766 A | 8/1966 | Amos | |
| 3,304,599 A | 2/1967 | Nordin | |
| 3,354,331 A | 11/1967 | Broeker et al. | |
| 3,365,657 A | 1/1968 | Webb | |
| 3,372,283 A | 3/1968 | Jaecklin | |
| 3,392,779 A | 7/1968 | Tilbrook | |
| 3,411,027 A | 11/1968 | Rosenberg | |
| 3,418,530 A | 12/1968 | Cheever | |
| 3,435,262 A | 3/1969 | Bennett et al. | |
| 3,437,858 A | 4/1969 | White | |
| 3,444,407 A | 5/1969 | Yates | |
| 3,447,002 A | 5/1969 | Ronnevig | |
| 3,484,690 A | 12/1969 | Wald | |
| 3,541,221 A | 11/1970 | Aupoix et al. | |
| 3,560,777 A | 2/1971 | Moeller | |
| 3,571,690 A | 3/1971 | Apsit | |
| 3,593,123 A | 7/1971 | Williamson | |
| 3,631,519 A | 12/1971 | Salahshourian | |
| 3,644,662 A | 2/1972 | Salahshourian | |
| 3,651,244 A | 3/1972 | Silver et al. | |
| 3,651,402 A | 3/1972 | Leffmann | |
| 3,660,721 A | 5/1972 | Baird | |
| 3,666,876 A | 5/1972 | Forster | |
| 3,670,192 A | 6/1972 | Andersson et al. | |
| 3,675,056 A | 7/1972 | Lenz | |
| 3,684,821 A | 8/1972 | Miyauchi et al. | |
| 3,684,906 A | 8/1972 | Lexz | |
| 3,699,238 A * | 10/1972 | Hansen et al. | 174/115 |
| 3,716,652 A | 2/1973 | Lusk et al. | |
| 3,716,719 A | 2/1973 | Angelery et al. | |
| 3,727,085 A | 4/1973 | Goetz et al. | |
| 3,740,600 A | 6/1973 | Turley | |
| 3,743,867 A | 7/1973 | Smith, Jr. | |
| 3,746,954 A | 7/1973 | Myles et al. | |
| 3,758,699 A | 9/1973 | Lusk et al. | |
| 3,778,891 A | 12/1973 | Amasino et al. | |
| 3,781,739 A | 12/1973 | Meyer | |
| 3,787,607 A | 1/1974 | Schlafly | |
| 3,792,399 A | 2/1974 | McLyman | |
| 3,801,843 A | 4/1974 | Corman et al. | |
| 3,809,933 A | 5/1974 | Sugawara et al. | |
| 3,813,764 A | 6/1974 | Tanaka et al. | |
| 3,828,115 A | 8/1974 | Hvizd, Jr. | |
| 3,881,647 A | 5/1975 | Wolfe | |
| 3,884,154 A | 5/1975 | Marten | |
| 3,891,880 A | 6/1975 | Britsch | |
| 3,902,000 A | 8/1975 | Forsyth et al. | |
| 3,912,957 A | 10/1975 | Reynolds | |
| 3,932,779 A | 1/1976 | Madsen | |
| 3,932,791 A | 1/1976 | Oswald | |
| 3,943,392 A | 3/1976 | Keuper et al. | |
| 3,947,278 A | 3/1976 | Youtsey | |
| 3,965,408 A | 6/1976 | Higuchi et al. | |
| 3,968,388 A | 7/1976 | Lambrecht et al. | |
| 3,971,543 A | 7/1976 | Shanahan | |
| 3,974,314 A | 8/1976 | Fuchs | |
| 3,993,860 A | 11/1976 | Snow et al. | |
| 3,995,785 A | 12/1976 | Arick et al. | |
| 4,001,616 A | 1/1977 | Lonseth et al. | |
| 4,008,367 A | 2/1977 | Sunderhauf | |
| 4,008,409 A | 2/1977 | Rhudy et al. | |
| 4,031,310 A | 6/1977 | Jachimowicz | |
| 4,037,312 A * | 7/1977 | Dels | 29/598 |
| 4,039,740 A | 8/1977 | Iwata | |
| 4,041,431 A | 8/1977 | Enoksen | |
| 4,047,138 A | 9/1977 | Steigerwald | |
| 4,053,820 A * | 10/1977 | Peterson et al. | 363/44 |
| 4,064,419 A | 12/1977 | Peterson | |
| 4,084,307 A | 4/1978 | Schultz et al. | |
| 4,085,347 A | 4/1978 | Lichius | |
| 4,088,953 A | 5/1978 | Sarian | |
| 4,091,138 A | 5/1978 | Takagi et al. | |
| 4,091,139 A | 5/1978 | Quirk | |
| 4,099,227 A | 7/1978 | Liptak | |
| 4,103,075 A | 7/1978 | Adam | |
| 4,106,069 A | 8/1978 | Trautner et al. | |
| 4,107,092 A | 8/1978 | Carnahan et al. | |
| 4,109,098 A | 8/1978 | Olsson et al. | |
| 4,121,148 A | 10/1978 | Platzer | |
| 4,132,914 A | 1/1979 | Khutoretsky | |
| 4,134,036 A | 1/1979 | Curtiss | |
| 4,134,055 A | 1/1979 | Akamatsu | |
| 4,134,146 A | 1/1979 | Stetson | |
| 4,149,101 A | 4/1979 | Lesokhin et al. | |
| 4,152,615 A | 5/1979 | Calfo et al. | |
| 4,160,193 A | 7/1979 | Richmond | |
| 4,164,672 A | 8/1979 | Flick | |
| 4,164,772 A | 8/1979 | Hingorani | |
| 4,177,397 A | 12/1979 | Lill | |
| 4,177,418 A | 12/1979 | Brueckner et al. | |
| 4,184,186 A | 1/1980 | Barkan | |
| 4,200,817 A | 4/1980 | Bratoljic | |
| 4,200,818 A | 4/1980 | Ruffing et al. | |

| | | | |
|---|---|---|---|
| 4,206,395 A * | 6/1980 | Okuyama et al. ............ 318/716 |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A | 12/1981 | Schuler |
| 4,308,575 A | 12/1981 | Mase |
| 4,310,966 A | 1/1982 | Brietenbach |
| 4,314,168 A | 2/1982 | Breitenbach |
| 4,317,001 A | 2/1982 | Silver et al. |
| 4,320,645 A | 3/1982 | Stanley |
| 4,321,426 A | 3/1982 | Schaeffer |
| 4,321,518 A | 3/1982 | Akamatsu |
| 4,330,726 A | 5/1982 | Albright et al. |
| 4,337,922 A | 7/1982 | Streiff et al. |
| 4,341,989 A | 7/1982 | Sandberg et al. |
| 4,347,449 A | 8/1982 | Beau |
| 4,347,454 A | 8/1982 | Gellert et al. |
| 4,353,612 A | 10/1982 | Meyers |
| 4,357,542 A | 11/1982 | Kirschbaum |
| 4,360,748 A | 11/1982 | Raschbichler et al. |
| 4,361,723 A | 11/1982 | Hvizd, Jr. et al. |
| 4,365,178 A | 12/1982 | Lexz |
| 4,367,425 A | 1/1983 | Mendelsohn et al. |
| 4,367,890 A | 1/1983 | Spirk |
| 4,368,418 A | 1/1983 | Demello et al. |
| 4,369,389 A | 1/1983 | Lambrecht |
| 4,371,745 A | 2/1983 | Sakashit |
| 4,384,944 A | 5/1983 | Silver et al. |
| 4,401,920 A | 8/1983 | Taylor et al. |
| 4,403,163 A | 9/1983 | Rarmerding et al. |
| 4,404,486 A | 9/1983 | Keim et al. |
| 4,411,710 A | 10/1983 | Mochizuki et al. |
| 4,421,284 A | 12/1983 | Pan |
| 4,425,521 A | 1/1984 | Rosenberry, Jr. et al. |
| 4,426,771 A | 1/1984 | Wang et al. |
| 4,429,244 A | 1/1984 | Nikiten et al. |
| 4,431,960 A | 2/1984 | Zucker |
| 4,432,029 A | 2/1984 | Lundqvist |
| 4,437,464 A | 3/1984 | Crow |
| 4,443,725 A | 4/1984 | Derderian et al. |
| 4,470,884 A | 9/1984 | Carr |
| 4,473,765 A | 9/1984 | Butman, Jr. et al. |
| 4,475,075 A | 10/1984 | Munn |
| 4,477,690 A | 10/1984 | Nikitin et al. |
| 4,481,438 A | 11/1984 | Keim |
| 4,484,106 A | 11/1984 | Taylor et al. |
| 4,488,079 A | 12/1984 | Dailey et al. |
| 4,490,651 A | 12/1984 | Taylor et al. |
| 4,503,284 A | 3/1985 | Minnick et al. |
| 4,508,251 A | 4/1985 | Harada et al. |
| 4,510,077 A | 4/1985 | Elton |
| 4,517,471 A * | 5/1985 | Sachs .......................... 307/67 |
| 4,520,287 A | 5/1985 | Wang et al. |
| 4,523,249 A | 6/1985 | Arimoto |
| 4,538,131 A | 8/1985 | Baier et al. |
| 4,546,210 A | 10/1985 | Akiba et al. |
| 4,551,780 A | 11/1985 | Canay |
| 4,557,038 A | 12/1985 | Wcislo et al. |
| 4,560,896 A | 12/1985 | Vogt et al. |
| 4,565,929 A | 1/1986 | Baskin et al. |
| 4,571,453 A | 2/1986 | Takaoka et al. |
| 4,588,916 A | 5/1986 | Lis |
| 4,589,048 A * | 5/1986 | Takata ........................ 361/42 |
| 4,590,416 A | 5/1986 | Porche et al. |
| 4,594,630 A | 6/1986 | Rabinowitz et al. |
| 4,607,183 A | 8/1986 | Rieber et al. |
| 4,615,109 A | 10/1986 | Wcislo et al. |
| 4,615,778 A | 10/1986 | Elton |
| 4,618,795 A | 10/1986 | Cooper et al. |
| 4,619,040 A | 10/1986 | Wang et al. |
| 4,622,116 A | 11/1986 | Elton et al. |
| 4,623,830 A * | 11/1986 | Peneder et al. ............. 318/798 |
| 4,630,163 A * | 12/1986 | Cooper et al. ................ 361/56 |
| 4,633,109 A | 12/1986 | Feigel |
| 4,650,924 A | 3/1987 | Kauffman et al. |
| 4,652,963 A | 3/1987 | Fahlen |
| 4,656,316 A | 4/1987 | Meltsch |
| 4,656,379 A | 4/1987 | McCarty |
| 4,677,328 A | 6/1987 | Kumakura |
| 4,687,882 A | 8/1987 | Stone et al. |
| 4,692,731 A | 9/1987 | Osinga |
| 4,723,083 A | 2/1988 | Elton |
| 4,723,104 A | 2/1988 | Rohatyn |
| 4,724,345 A | 2/1988 | Elton et al. |
| 4,732,412 A | 3/1988 | van der Linden et al. |
| 4,737,704 A | 4/1988 | Kalinnikov et al. |
| 4,745,314 A | 5/1988 | Nakano |
| 4,757,435 A * | 7/1988 | Wood et al. .................. 363/54 |
| 4,761,602 A | 8/1988 | Leibovich |
| 4,766,365 A | 8/1988 | Bolduc et al. |
| 4,771,168 A | 9/1988 | Gundersen et al. |
| 4,785,138 A | 11/1988 | Brietenbach et al. |
| 4,795,933 A | 1/1989 | Sakai |
| 4,812,669 A * | 3/1989 | Takeda et al. ............... 307/105 |
| 4,827,172 A | 5/1989 | Kobayashi |
| 4,845,308 A | 7/1989 | Womack, Jr. et al. |
| 4,847,747 A | 7/1989 | Abbondanti |
| 4,853,565 A | 8/1989 | Elton et al. |
| 4,859,810 A | 8/1989 | Cloetens et al. |
| 4,859,989 A | 8/1989 | McPherson |
| 4,860,430 A | 8/1989 | Raschbichler et al. |
| 4,864,266 A | 9/1989 | Feather et al. |
| 4,883,230 A | 11/1989 | Lindstrom |
| 4,890,040 A | 12/1989 | Gundersen |
| 4,894,284 A | 1/1990 | Yamanouchi et al. |
| 4,914,386 A | 4/1990 | Zocholl |
| 4,918,347 A | 4/1990 | Takaba |
| 4,918,835 A | 4/1990 | Wcislo et al. |
| 4,924,342 A | 5/1990 | Lee |
| 4,926,079 A | 5/1990 | Niemela et al. |
| 4,942,326 A | 7/1990 | Butler, III et al. |
| 4,949,001 A | 8/1990 | Campbell |
| 4,982,147 A | 1/1991 | Lauw |
| 4,994,952 A | 2/1991 | Silva et al. |
| 4,997,995 A | 3/1991 | Simmons et al. |
| 5,012,125 A | 4/1991 | Conway |
| 5,030,813 A | 7/1991 | Stanisz |
| 5,036,165 A | 7/1991 | Elton et al. |
| 5,036,238 A | 7/1991 | Tajima |
| 5,066,881 A | 11/1991 | Elton et al. |
| 5,067,046 A | 11/1991 | Elton et al. |
| 5,083,360 A | 1/1992 | Valencic et al. |
| 5,086,246 A | 2/1992 | Dymond et al. |
| 5,091,609 A | 2/1992 | Swada et al. |
| 5,094,703 A | 3/1992 | Takaoka et al. |
| 5,095,175 A | 3/1992 | Yoshida et al. |
| 5,097,241 A | 3/1992 | Smith et al. |
| 5,097,591 A | 3/1992 | Wcislo et al. |
| 5,111,095 A | 5/1992 | Hendershot |

| Patent | | Date | Inventor | | Country | Number | Date |
|---|---|---|---|---|---|---|---|
| 5,124,607 | A | 6/1992 | Rieber et al. | | DE | 426793 | 3/1926 |
| 5,132,278 | A * | 7/1992 | Stevens et al. ............... 505/1 | | DE | 432169 | 7/1926 |
| 5,136,459 | A | 8/1992 | Fararooy | | DE | 433749 | 9/1926 |
| 5,140,290 | A | 8/1992 | Dersch | | DE | 435608 | 10/1926 |
| 5,153,460 | A | 10/1992 | Bovino et al. | | DE | 435609 | 10/1926 |
| 5,168,662 | A | 12/1992 | Nakamura et al. | | DE | 441717 | 3/1927 |
| 5,171,941 | A | 12/1992 | Shimizu et al. | | DE | 443011 | 4/1927 |
| 5,182,537 | A | 1/1993 | Thuis | | DE | 460124 | 5/1928 |
| 5,187,428 | A | 2/1993 | Hutchison et al. | | DE | 482506 | 9/1929 |
| 5,231,249 | A | 7/1993 | Kimura et al. | | DE | 501181 | 7/1930 |
| 5,235,488 | A | 8/1993 | Koch | | DE | 523047 | 4/1931 |
| 5,246,783 | A | 9/1993 | Spenadel et al. | | DE | 568508 | 1/1933 |
| 5,264,778 | A | 11/1993 | Kimmel et al. | | DE | 572030 | 3/1933 |
| 5,287,262 | A | 2/1994 | Klein | | DE | 584639 | 9/1933 |
| 5,304,883 | A | 4/1994 | Denk | | DE | 586121 | 10/1933 |
| 5,305,961 | A | 4/1994 | Errard et al. | | DE | 604972 | 11/1934 |
| 5,321,308 | A | 6/1994 | Johncock | | DE | 629301 | 4/1936 |
| 5,323,330 | A | 6/1994 | Asplund et al. | | DE | 673545 | 3/1939 |
| 5,325,008 | A | 6/1994 | Grant | | DE | 719009 | 3/1942 |
| 5,325,259 | A | 6/1994 | Paulsson | | DE | 846583 | 8/1952 |
| 5,327,637 | A | 7/1994 | Britenbach et al. | | DE | 875227 | 4/1953 |
| 5,341,281 | A | 8/1994 | Skibinski | | DE | 975999 | 1/1963 |
| 5,343,139 | A | 8/1994 | Gyugyi et al. | | DE | 1465719 | 5/1969 |
| 5,355,046 | A | 10/1994 | Weigelt | | DE | 1807391 | 5/1970 |
| 5,365,132 | A | 11/1994 | Hann et al. | | DE | 2050674 | 5/1971 |
| 5,387,890 | A | 2/1995 | Estop et al. | | DE | 1638176 | 6/1971 |
| 5,397,513 | A | 3/1995 | Steketee, Jr. | | DE | 2155371 | 5/1973 |
| 5,399,941 | A | 3/1995 | Grothaus et al. | | DE | 2400698 | 7/1975 |
| 5,400,005 | A | 3/1995 | Bobry | | DE | 2520511 | 11/1976 |
| 5,408,169 | A | 4/1995 | Jeanneret | | DE | 2656389 | 6/1978 |
| 5,444,609 | A * | 8/1995 | Swamy et al. ............... 363/47 | | DE | 2721905 | 11/1978 |
| 5,449,861 | A | 9/1995 | Fujino et al. | | DE | 137164 | 8/1979 |
| 5,452,170 | A | 9/1995 | Ohde et al. | | DE | 138840 | 11/1979 |
| 5,468,916 | A | 11/1995 | Litenas et al. | | DE | 2824951 | 12/1979 |
| 5,491,624 | A * | 2/1996 | Levran et al. ............... 363/87 | | DE | 2835386 | 2/1980 |
| 5,499,178 | A | 3/1996 | Mohan | | DE | 2839517 | 3/1980 |
| 5,500,632 | A | 3/1996 | Halser, III | | DE | 2854520 | 6/1980 |
| 5,510,942 | A | 4/1996 | Bock et al. | | DE | 3009102 | 9/1980 |
| 5,530,307 | A | 6/1996 | Horst | | DE | 2913697 | 10/1980 |
| 5,533,658 | A | 7/1996 | Benedict et al. | | DE | 2920478 | 12/1980 |
| 5,534,754 | A | 7/1996 | Poumey | | DE | 3028777 | 3/1981 |
| 5,545,853 | A | 8/1996 | Hildreth | | DE | 2939004 | 4/1981 |
| 5,550,410 | A | 8/1996 | Titus | | DE | 3006382 | 8/1981 |
| 5,583,387 | A | 12/1996 | Takeuchi et al. | | DE | 3008818 | 9/1981 |
| 5,587,126 | A | 12/1996 | Steketee, Jr. | | DE | 209313 | 4/1984 |
| 5,598,137 | A | 1/1997 | Alber et al. | | DE | 3305225 | 8/1984 |
| 5,607,320 | A | 3/1997 | Wright | | DE | 3309051 | 9/1984 |
| 5,612,510 | A | 3/1997 | Hildreth | | DE | 3441311 | 5/1986 |
| 5,663,605 | A | 9/1997 | Evans et al. | | DE | 3543106 | 6/1987 |
| 5,672,926 | A | 9/1997 | Brandes et al. | | DE | 2917717 | 8/1987 |
| 5,689,223 | A | 11/1997 | Demarmels et al. | | DE | 3612112 | 10/1987 |
| 5,734,249 | A * | 3/1998 | Pohjalainen et al. ........ 318/798 | | DE | 3726346 | 2/1989 |
| 5,807,447 | A | 9/1998 | Forrest | | DE | 3925337 | 2/1991 |
| 5,834,699 | A | 11/1998 | Buck et al. | | DE | 4023903 | 11/1991 |
| 5,905,647 | A * | 5/1999 | Shirai ........................ 363/141 | | DE | 4022476 | 1/1992 |
| 5,990,654 | A * | 11/1999 | Skibinski et al. .......... 318/800 | | DE | 4233558 | 3/1994 |
| 6,038,151 | A * | 3/2000 | Jiang et al. ................. 363/89 | | DE | 4402184 | 8/1995 |
| | | | | | DE | 4409794 | 8/1995 |
| | | FOREIGN PATENT DOCUMENTS | | | DE | 4412761 | 10/1995 |
| | | | | | DE | 4420322 | 12/1995 |
| CH | | 539328 | 7/1973 | | DE | 19620906 | 1/1996 |
| CH | | 646403 | 2/1979 | | DE | 4438186 | 5/1996 |
| CH | | 657482 | 8/1986 | | DE | 19020222 | 3/1997 |
| CH | | 1189322 | 10/1986 | | DE | 19547229 | 6/1997 |
| DE | | 40414 | 8/1887 | | DE | 468827 | 7/1997 |
| DE | | 277012 | 7/1914 | | DE | 134022 | 12/2001 |
| DE | | 336418 | 6/1920 | | EP | 049104 | 4/1982 |
| DE | | 372390 | 3/1923 | | EP | 0493704 | 4/1982 |
| DE | | 386561 | 12/1923 | | EP | 0056580 A1 | 7/1982 |
| DE | | 387973 | 1/1924 | | EP | 078908 | 5/1983 |
| DE | | 406371 | 11/1924 | | EP | 0120154 | 10/1984 |
| DE | | 425551 | 2/1926 | | | | |

| | | | | | | |
|---|---|---|---|---|---|---|
| EP | 0130124 | 1/1985 | | GB | 537609 | 6/1941 |
| EP | 0142813 | 5/1985 | | GB | 540456 | 10/1941 |
| EP | 0155405 | 9/1985 | | GB | 589071 | 6/1947 |
| EP | 0102513 | 1/1986 | | GB | 666883 | 2/1952 |
| EP | 0174783 | 3/1986 | | GB | 685416 | 1/1953 |
| EP | 0185788 | 7/1986 | | GB | 702892 | 1/1954 |
| EP | 0277358 | 8/1986 | | GB | 715226 | 9/1954 |
| EP | 0234521 | 9/1987 | | GB | 723457 | 2/1955 |
| EP | 0244069 | 11/1987 | | GB | 739962 | 11/1955 |
| EP | 0246377 | 11/1987 | | GB | 763761 | 12/1956 |
| EP | 0265868 | 5/1988 | | GB | 805721 | 12/1958 |
| EP | 0274691 | 7/1988 | | GB | 827600 | 2/1960 |
| EP | 0280759 | 9/1988 | | GB | 854728 | 11/1960 |
| EP | 0282876 | 9/1988 | | GB | 870583 | 6/1961 |
| EP | 0309096 | 3/1989 | | GB | 913386 | 12/1962 |
| EP | 0314860 | 5/1989 | | GB | 965741 | 8/1964 |
| EP | 0316911 | 5/1989 | | GB | 992249 | 5/1965 |
| EP | 0317248 | 5/1989 | | GB | 1024583 | 3/1966 |
| EP | 0335430 | 10/1989 | | GB | 1053337 | 12/1966 |
| EP | 0342554 | 11/1989 | | GB | 1059123 | 2/1967 |
| EP | 0221404 | 5/1990 | | GB | 1103098 | 2/1968 |
| EP | 0375101 | 6/1990 | | GB | 1103099 | 2/1968 |
| EP | 0406437 | 1/1991 | | GB | 1117401 | 6/1968 |
| EP | 0439410 | 7/1991 | | GB | 1135242 | 12/1968 |
| EP | 0440865 | 8/1991 | | GB | 1147049 | 4/1969 |
| EP | 0469155 A1 | 2/1992 | | GB | 1157885 | 7/1969 |
| EP | 0490705 | 6/1992 | | GB | 1174659 | 12/1969 |
| EP | 0503817 | 9/1992 | | GB | 1236082 | 6/1971 |
| EP | 0571155 | 11/1993 | | GB | 1268770 | 3/1972 |
| EP | 0620570 | 10/1994 | | GB | 1319257 | 6/1973 |
| EP | 0620630 | 10/1994 | | GB | 1322433 | 7/1973 |
| EP | 0642027 | 3/1995 | | GB | 1340983 | 12/1973 |
| EP | 0671632 | 9/1995 | | GB | 1341050 | 12/1973 |
| EP | 0676777 | 10/1995 | | GB | 1365191 | 8/1974 |
| EP | 0677915 | 10/1995 | | GB | 1395152 | 5/1975 |
| EP | 0684679 | 11/1995 | | GB | 1424982 | 2/1976 |
| EP | 0684682 | 11/1995 | | GB | 1426594 | 3/1976 |
| EP | 0695019 | 1/1996 | | GB | 1438610 | 6/1976 |
| EP | 0732787 | 9/1996 | | GB | 1445284 | 8/1976 |
| EP | 0738034 | 10/1996 | | GB | 1479904 | 7/1977 |
| EP | 0739087 A2 | 10/1996 | | GB | 1493163 | 11/1977 |
| EP | 0740315 | 10/1996 | | GB | 1502938 | 3/1978 |
| EP | 0749190 A2 | 12/1996 | | GB | 1525745 | 9/1978 |
| EP | 0751605 | 1/1997 | | GB | 2000625 | 1/1979 |
| EP | 0739087 A3 | 3/1997 | | GB | 1548633 | 7/1979 |
| EP | 0749193 A3 | 3/1997 | | GB | 2046142 | 11/1979 |
| EP | 0780926 | 6/1997 | | GB | 2022327 | 12/1979 |
| EP | 0802542 | 10/1997 | | GB | 2025150 | 1/1980 |
| EP | 0913912 A1 | 5/1999 | | GB | 2034101 | 5/1980 |
| FR | 805544 | 4/1936 | | GB | 1574796 | 9/1980 |
| FR | 841351 | 1/1938 | | GB | 2070341 | 9/1981 |
| FR | 847899 | 12/1938 | | GB | 2070470 | 9/1981 |
| FR | 916959 | 12/1946 | | GB | 2071433 | 9/1981 |
| FR | 1011924 | 4/1949 | | GB | 2081523 | 2/1982 |
| FR | 1126975 | 3/1955 | | GB | 2099635 | 12/1982 |
| FR | 1238795 | 7/1959 | | GB | 2105925 | 3/1983 |
| FR | 2108171 | 5/1972 | | GB | 2106306 | 4/1983 |
| FR | 2251938 | 6/1975 | | GB | 2106721 | 4/1983 |
| FR | 2305879 | 10/1976 | | GB | 2136214 | 9/1984 |
| FR | 2376542 | 7/1978 | | GB | 2140195 | 11/1984 |
| FR | 2467502 | 4/1981 | | GB | 2150153 | 6/1985 |
| FR | 2481531 | 10/1981 | | GB | 2268337 | 1/1994 |
| FR | 2556146 | 6/1985 | | GB | 2273819 | 6/1994 |
| FR | 2594271 | 8/1987 | | GB | 2283133 | 4/1995 |
| FR | 2708157 | 1/1995 | | GB | 2289992 | 12/1995 |
| GB | 123906 | 3/1919 | | GB | 2308490 | 6/1997 |
| GB | 268271 | 3/1927 | | GB | 2332557 | 6/1999 |
| GB | 293861 | 11/1928 | | HU | 175494 | 11/1981 |
| GB | 292999 | 4/1929 | | JP | 60206121 | 3/1959 |
| GB | 319313 | 7/1929 | | JP | 57043529 | 8/1980 |
| GB | 518993 | 3/1940 | | JP | 57126117 | 5/1982 |

| | | | | | | |
|---|---|---|---|---|---|---|
| JP | 59076156 | 10/1982 | | WO | WO9745914 | 12/1997 |
| JP | 59159642 | 2/1983 | | WO | WO9745915 | 12/1997 |
| JP | 6264964 | 9/1985 | | WO | WO9745916 | 12/1997 |
| JP | 1129737 | 5/1989 | | WO | WO9745918 | 12/1997 |
| JP | 62320631 | 6/1989 | | WO | WO9745919 | 12/1997 |
| JP | 2017474 | 1/1990 | | WO | WO9745920 | 12/1997 |
| JP | 3245748 | 2/1990 | | WO | WO9745921 | 12/1997 |
| JP | 4179107 | 11/1990 | | WO | WO9745922 | 12/1997 |
| JP | 318253 | 1/1991 | | WO | WO9745923 | 12/1997 |
| JP | 424909 | 1/1992 | | WO | WO9745924 | 12/1997 |
| JP | 5290947 | 4/1992 | | WO | WO9745925 | 12/1997 |
| JP | 6196343 | 12/1992 | | WO | WO9745926 | 12/1997 |
| JP | 6233442 | 2/1993 | | WO | WO9745927 | 12/1997 |
| JP | 6325629 | 5/1993 | | WO | WO9745928 | 12/1997 |
| JP | 7057951 | 8/1993 | | WO | WO9745929 | 12/1997 |
| JP | 7264789 | 3/1994 | | WO | WO9745930 | 12/1997 |
| JP | 8167332 | 12/1994 | | WO | WO9745931 | 12/1997 |
| JP | 7161270 | 6/1995 | | WO | WO9745932 | 12/1997 |
| JP | 8264039 | 11/1995 | | WO | WO9745933 | 12/1997 |
| JP | 9200989 | 1/1996 | | WO | WO9745934 | 12/1997 |
| JP | 8036952 | 2/1996 | | WO | WO9745935 | 12/1997 |
| JP | 8167360 | 6/1996 | | WO | WO9745936 | 12/1997 |
| LU | 67199 | 3/1972 | | WO | WO9745937 | 12/1997 |
| SE | 90308 | 9/1937 | | WO | WO9745938 | 12/1997 |
| SE | 305899 | 11/1968 | | WO | WO9745939 | 12/1997 |
| SE | 255156 | 2/1969 | | WO | WO9747067 | 12/1997 |
| SE | 341428 | 12/1971 | | WO | WO9820595 | 5/1998 |
| SE | 453236 | 1/1982 | | WO | WO9820596 | 5/1998 |
| SE | 457792 | 6/1987 | | WO | WO9820597 | 5/1998 |
| SE | 502417 | 12/1993 | | WO | WO 98/20598 | 5/1998 |
| SU | 792302 | 1/1971 | | WO | WO9820600 | 5/1998 |
| SU | 425268 | 9/1974 | | WO | WO 98/20602 | 5/1998 |
| SU | 1019553 | 1/1980 | | WO | WO9821385 | 5/1998 |
| SU | 694939 | 1/1982 | | WO | PCT/FR 98/00468 | 6/1998 |
| SU | 955369 | 8/1983 | | WO | WO9827634 | 6/1998 |
| SU | 1511810 | 5/1987 | | WO | WO9827635 | 6/1998 |
| WO | WO8202617 | 8/1982 | | WO | WO9827636 | 6/1998 |
| WO | WO8502302 | 5/1985 | | WO | WO9829927 | 7/1998 |
| WO | WO9011389 | 10/1990 | | WO | WO9829928 | 7/1998 |
| WO | WO9012409 | 10/1990 | | WO | WO9829929 | 7/1998 |
| WO | PCT E 90/00279 | 11/1990 | | WO | WO9829930 | 7/1998 |
| WO | WO9101059 | 1/1991 | | WO | WO9829931 | 7/1998 |
| WO | WO9101585 | 2/1991 | | WO | WO9829932 | 7/1998 |
| WO | WO9107807 | 3/1991 | | WO | WO9833731 | 8/1998 |
| WO | PCT SE 91/00077 | 4/1991 | | WO | WO9833736 | 8/1998 |
| WO | WO9109442 | 6/1991 | | WO | WO9833737 | 8/1998 |
| WO | WO 91/11841 | 8/1991 | | WO | WO9834238 | 8/1998 |
| WO | WO8115862 | 10/1991 | | WO | WO 98/34239 | 8/1998 |
| WO | WO 91/15755 | 10/1991 | | WO | WO9834240 | 8/1998 |
| WO | WO9201328 | 1/1992 | | WO | WO9834241 | 8/1998 |
| WO | WO9203870 | 3/1992 | | WO | WO9834242 | 8/1998 |
| WO | WO9321681 | 10/1993 | | WO | WO9834243 | 8/1998 |
| WO | WO9406194 | 3/1994 | | WO | WO9834244 | 8/1998 |
| WO | WO9518058 | 7/1995 | | WO | WO9834245 | 8/1998 |
| WO | WO9522153 | 8/1995 | | WO | WO9834246 | 8/1998 |
| WO | WO9524049 | 9/1995 | | WO | WO9834247 | 8/1998 |
| WO | WO9622606 | 7/1996 | | WO | WO9834248 | 8/1998 |
| WO | WO9622607 | 7/1996 | | WO | WO9834249 | 8/1998 |
| WO | PCT/CN 96/00010 | 10/1996 | | WO | WO9834250 | 8/1998 |
| WO | WO9630144 | 10/1996 | | WO | WO9834309 | 8/1998 |
| WO | WO9710640 | 3/1997 | | WO | WO9834312 | 8/1998 |
| WO | WO9711831 | 4/1997 | | WO | WO9834321 | 8/1998 |
| WO | WO 97/45908 | 4/1997 | | WO | WO9834322 | 8/1998 |
| WO | WO9716881 | 5/1997 | | WO | WO9834323 | 8/1998 |
| WO | WO 97/29494 | 8/1997 | | WO | WO9834325 | 8/1998 |
| WO | WO9745288 | 12/1997 | | WO | WO9834326 | 8/1998 |
| WO | WO9745847 | 12/1997 | | WO | WO9834327 | 8/1998 |
| WO | WO9745848 | 12/1997 | | WO | WO9834328 | 8/1998 |
| WO | WO9745906 | 12/1997 | | WO | WO9834329 | 8/1998 |
| WO | WO9745907 | 12/1997 | | WO | WO9834330 | 8/1998 |
| WO | WO9745912 | 12/1997 | | WO | WO9834331 | 8/1998 |

| | | |
|---|---|---|
| WO | WO 98/40627 | 9/1998 |
| WO | WO9834315 | 10/1998 |
| WO | WO 98/43336 | 10/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Eine neue Type von Unterwassermotoren; Electrotechnik und Maschinenbam, 49; Aug. 1931; pp. 2–3.

Problems in design of the 110–5OokV high–voltage generators; Nikiti et al; World Electrotechnical Congress; 6/21–27/77; Section 1. Paper #18.

Manufacture and Testing of Roebel bars; P. Marti et al; 1960, Pub.86, vol. 8, pp. 25–31.

Hydroalternators of 110 to 220 kV Elektrotechn. Obz., vol. 64, No. 3, pp. I32–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 60kV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp. 35–40, 1988.

Zur Entwicklung der Tauchpumpenmotoren; A. Schanz; KSB, pp. 19–24.

Direct Generation of alternating current at high voltages; R. Parsons; IEEE Journal, vol. 67 #393, Jan. 15, 1929; pp. 1065–1080.

Stopfbachslose Umwalzpumpen– ein wichtiges Element im modernen Kraftwerkbau; H. Holz, KSB 1, pp. 13–19, 1960.

Zur Geschichte der Brown Boveri–Synchron–Maschinen; Vierzig Jahre Generatorbau; Jan.–Feb. 1931 pp. 15–39.

Technik und Anwendung moderner Tauchpumpen; A. Heumann; 1987.

High capacity synchronous generator having no tooth stator; V.S. Kildishev et al; No. 1, 1977 pp. 11–16.

Der Asynchronmotor als Antrieb stopfbcichsloser Pumpen; E. Picmaus; Eletrotechnik und Maschinenbay No. 78, pp. 153–155, 1961.

Low core loss rotating flux transformer; R. F. Krause, et al; American Institute Physics J.Appl.Phys vol. 64 #10 Nov. 1988, pp. 5376–5378.

An EHV bulk Power transmission line Made with Low Loss XLPE Cable;Ichihara et al; 8/92; pp. 3–6.

Underground Transmission Systems Reference Book; 1992;pp. 16–19; pp. 36–45; pp. 67–81.

Power System Stability and Control; P. Kundur, 1994; pp. 23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp. 2694–2701.

Six phase Synchronous Machine with AC and DC Stator Connections, Part 1: Equivalent circuit representation and Steady–State Analysis; R. Schiferl et al; Aug. 1983; pp. 2685–2693.

Reactive Power Compensation; T. Petersson; 1993; pp. 1–23.

Permanent Magnet Machines; K. Binns; 1987; pp. 9–1 through 9–26.

Hochspannungsaniagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959, pp. 30–33.

Neue Lbsungswege zum Entwurf grosser Turbogeneratoren bis 2GVA, 60kV; G. Aicholzer; Sep. 1974, pp. 249–255.

Advanced Turbine–generators– an assessment; A. Appleton, et al; International Conf. Proceedings, Lg HV Elec. Sys. Paris, FR, Aug.–Sep. 1976, vol. I, Section 11–02, pp. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

Powerformer™ : A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp. 330–334.

Development of extruded polymer insulated superconducting cable; Jan. 1992.

Transformer core losses; B. Richardson; Proc. IEEE May 1986, pp. 365–368.

Cloth–transformer with divided windings and tension annealed amorphous wire; T. Yammamoto et al; IEEE Translation Journal of Magnetics in Japan vol. 4, No. 9 Sep. 1989.

A study of equipment sized and constraints for a unified power flow controller; J Bian et al; IEEE 1996.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64–70.

Analysis of faulted Power Systems; P Anderson, Iowa State University Press / Ames, Iowa, 1973, pp. 255–257.

36–Kv. Generators Arise from Insulation Research; P. Sidler; *Electrical World* Oct. 15, 1932, p. 524.

Oil Water cooled 300 MW turbine generator;L.P. Gnedin et al;*Elektrotechnika*, 1970, pp. 6–8.

J&P Transformer Book 11$^{th}$ Edition;A. C. Franklin et al; owned by Butterworth—Heinemann Ltd, Oxford Printed by Hartnolls Ltd in Great Britain 1983, pp. 29–67.

Transformerboard; H.P. Moser et al; 1979, pp. 1–19.

The Skagerrak transmission—the world's longest HVDC submarine cable link; L. Haglof et al of ASEA; ASEA Journal vol. 53, No. 1–2, 1980, pp. 3–12.

Direct Connection of Generators to HVDC Converters: Main Characteristics and Comparative Advantages; J.Arrillaga et al; *Electra* No. 149, Aug. 1993, pp. 19–37.

Our flexible friend article; M. Judge; *New Scientist*, May 10, 1997, pp. 44–48.

In–Service Performance of HVDC Converter transformers and oil–cooled smoothing reactors; G.L. Desilets et al; *Electra* No. 155, Aug. 1994, pp. 7–29.

Transformateurs a courant continu haute tension–examen des specifications; A. Lindroth et al; *Electra* No. 141, Apr. 1992, pp. 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Perormance in Modern Excitation Control Systems; G. K. Girgis et al; IEEE Energy Conservation, vol. 10, No. 3, Sep. 1995, pp. 538–542.

A High Initial response Brushless Excitation System; T. L. Dillman et al; IEEE Power Generation Winter Meeting Proceedings, Jan. 31, 1971, pp. 2089–2094.

Design, manufacturing and cold test of a superconducting coil and its cryostat for SMES applications; A. Bautista et al; IEEE Applied Superconductivity, vol. 7, No. 2, Jun. 1997, pp. 853–856.

Quench Protection and Stagnant Normal Zones in a Large Cryostable SMES; Y. Lvovsky et al; IEEE Applied Superconductivity, vol. 7, No. 2, Jun. 1997, pp. 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp. 840–843.

High Speed Synchronous Motors Adjustable Speed Drives; ASEA Generation Pamphlet OG 135–101 E, Jan. 1985, pp. 1–4.

Billig burk motar overtonen; A. Felldin; *ERA* (TEKNIK) Aug. 1994, pp. 26–28.

400–kV XLPE cable system passes CIGRE test; ABB Article; ABB Review Sep. 1995, p. 38.

FREQSYN—a new drive system for high power applications;J–A. Bergman et al; ASEA Journal 59, Apr. 1986, pp.16–19.

Canadians Create Conductive Concrete; J. Beaudoin et al; *Science*, vol. 276, May 23, 1997, p. 1201.

Fully Water–Cooled 190 MVA Generators in the Tonstad Hydroelectric Power Station; E. Ostby et al; BBC Review Aug. 1969, pp. 380–385.

Relocatable static var compensators help control unbundled power flows; R. C. Knight et al; *Transmission & Distribution*, Dec. 1996, pp. 49–54.

Investigation and Use of Asynchronized Machines in Power Systems*; N.I.Blotskii et al; *Elektrichestvo*, No. 12, 1–6, 1985, pp. 90–99.

Variable–speed switched reluctance motors; P.J. Lawrenson et al; IEE proc, vol. 127, Pt.B, No. 4, Jul. 1980, pp. 253–265.

Das Einphasenwechselstromsystem hoherer Frequenz; J.G. Heft; Elektrische Bahnen eb; Dec. 1987, pp. 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for Elkreafteknilk, KTH; Stockholm, 1996, pp. 3–6—3–12.

Die Wechselstromtechnik; A. Cour' Springer Verlag, Germany; 1936, pp. 586–598.

Insulation systems for superconducting transmission cables; O.Toennesen; Nordic Insulation Symposium, Bergen, 1996, pp. 425–432.

MPTC: An economical alternative to universal power flow controllers;N. Mohan; EPE 1997, Trondheim, pp. 3.1027–3.1030.

Lexikon der Technik; Luger; Band 2, Grundlagen der Elektrotechnik und Kerntechnik, 1960, p. 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp. 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp. 1–13.

Regulating transformers in power systems–new concepts and applications; E. Wirth et al; ABB Review Apr. 1997, pp. 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp. 91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp. 1–65.

Design and manufacture of a large superconducting homopolar motor; A.D. Appleton; IEEE Transactions on Magnetics, vol. 19,No. 3, Part 2, May 1983, pp. 1048–1050.

Application of high temperature superconductivy to electric motor design; J.S. Edmonds et al; IEEE Transactions on Energy Conversion Jun. 1992, No. 2 , pp. 322–329.

Power Electronics and Variable Frequency Drives; B. Bimal; IEEE industrial Electronics—Technology and Applications, 1996, p. 356.

Properties of High Plymer Cement Mortar; M. Tamai et al; *Science & Technology in Japan*, No. 63 ; 1977, pp. 6–14.

Weatherability of Polymer–Modified Mortars after Ten–Year Outdoor Exposure in Koriyama and Sapporo; Y. Ohama et al; *Science & Technology in Japan* No. 63; 1977, pp. 26–31.

SMC Powders Open New Magnetic Applications; M. Persson (Editor); *SMC Update* ,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, pp. 1882–1888.

Low–intensy laser–triggering of rail–gaps with magnesium–aerosol switching–gases; W. Frey; 11th International Pulse Power Conference, 1997, Baltimore, USA Digest of Technical Papers, pp. 322–327.

* cited by examiner

BAND-STOP FILTER

SERIES COMPENSATION OF ELECTRIC ALTERNATING CURRENT MACHINES

BACKGROUND OF THE INVENTION

1. Field of the Invention

The present invention relates to a method and a device for series compensating a rotating electric alternating current machine connected, directly or via a static current converter, to a three-phase distribution or transmission network, wherein the stator winding of the alternating current machine is Y-connected. The invention also relates to a rotating electric machine provided with such a series compensation device.

The invention refers primarily to electric alternating current machines intended for use as generators in power stations for generating electric power. A typical operating range may be 36 to 800 kV, so that they can be connected directly to all types of high-voltage power networks. This is possible thanks to the use of high-voltage insulated electric conductors with solid insulation similar to cables for transmitting electric power, in the following termed high-voltage cable. The cable is also provided with an outer semiconducting layer with the help of which its potential in relation to the surroundings is defined.

2. Discussion of the Background

A conductor is known through U.S Pat. No. 5,036,165, in which the insulation is provided with an inner and an outer layer of semiconducting pyrolized glassfiber. It is also known to provide conductors in a dynamo-electric machine with such an insulation, as described in U.S Pat. No. 5,066,881 for instance, where a semiconducting pyrolized glassfiber layer is in contact with the two parallel rods forming the conductor, and the insulation in the stator slots is surrounded by an outer layer of semiconducting pyrolized glassfiber. The pyrolized glassfiber material is described as suitable since it retains its resistivity even after the impregnation treatment.

Series compensation on both high voltage transmission networks and distribution networks is already known.

Series compensation on both high voltage transmission networks and distribution networks is already known. It is also well known that geomagnetically induced currents can cause harmful heating in directly grounded power network system From U.S Pat. No. A1, 4,341,989 a device is also previously known for phase compensation of a multiphase rotating electric alternating current machine by connecting in series or in parallel with each phase winding a capacitive element on the upside of the winding.

SUMMARY OF THE INVENTION

The object of the present invention is to provide a new method and a new device for lowering the system reactance through series compensation of the alternating current machine in question as well as for preventing geomagnetically induced currents.

This object is achieved with a method and a device of the type described in the introduction, having the features defined herein.

According to the invention, thus, the compensation is performed on the down side of the windings, so that low-voltage insulated capacitors can be used, which is not possible with series compensation in high-voltage transmission networks according to known technology. Less expensive capacitors can therefore be used in the device according to the invention, since they are protected by the machine itself and connected to the neutral point, which is at low potential in relation to earth. This solution is especially advantageous for the type of machines to which the present invention relates, since their upside is intended to be connected directly to high-voltage power networks.

According to an advantageous embodiment of the device according to invention, an over-voltage protection means is connected in parallel with the capacitors so that they are protected from any over-voltages that may appear in the event of a fault condition.

According to a second advantageous embodiment of the device according to the invention, a bandstop filter is arranged between the Y-point of the capacitor bank formed by the capacitors and the earth point of the distribution or transmission network, possibly with a low-ohmic resistor connected between the bandstop filter and the earth point. This resistor may be a neutral-point resistor, dimensioned for a harmless earth-fault current of a few tens of amperes. An earth fault in the alternating current machine or the generator is able to emit an earth-fault current via this resistor but, by controlling the earth-fault current, measures can be taken to disconnect the generator or possibly the faulty phase.

From a power network point of view any increase in transient machine reactance can also be efficiently compensated in this manner.

In the machine according to the invention the windings are preferably composed of cables having solid, extruded insulation, of a type now used for power distribution, such as XLPE-cables or cables with EPR-insulation. Such cables are flexible, which is an important property in this context since the technology for the machine according to the invention is based primarily on winding systems in which the winding is formed from cable which is bent during assembly. The flexibility of a XLPE-cable normally corresponds to a radius of curvature of approximately 20 cm for a cable 30 mm in diameter, and a radius of curvature of approximately 65 cm for a cable 80 mm in diameter. In the present application the term "flexible" is used to indicate that the winding is flexible down to a radius of curvature of the order of four times the cable diameter, preferably eight to twelve times the cable diameter.

Windings in the present invention are constructed to retain their properties even when they are bent and when they are subjected to thermal stress during operation. It is vital that the layers retain their adhesion to each other in this context. The material properties of the layers are decisive here, particularly their elasticity and relative coefficients of thermal expansion. In a XLPE-cable, for instance, the insulating layer consists of cross-linked, lowdensity polyethylene, and the semiconducting layers consist of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^{6}$ ohm-cm, e.g. 1–500 ohm-cm, or 10–200 ohm-cm, naturally also fall within the scope of the invention.

The insulating layer may consist, for example, of a solid thermoplastic material such as low-density polyethylene (LDPE), high-density polyethylene (HDPE), polypropylene (PP), polybutylene (PB), polymethyl pentene (PMP), cross-linked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of. thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymers/nitrile rubber, butyl graft polyethylene, ethylene-butyl-acrylate-copolymers and ethylene-ethyl-acrylate copolymers may also constitute suitable polymers for the semiconducting layers.

Even when different types of material are used as base in the various layers, it is desirable for their coefficients of thermal expansion to be substantially the same. This is the case with combination of the materials listed above.

The materials listed above have relatively good elasticity, with an E-modulus of E<500 MPa, preferably <200 MPa. The elasticity is sufficient for any minor differences between the coefficients of thermal expansion for the materials in the layers to be absorbed in the radial direction of the elasticity so that no cracks or other damage appear and so that the layers are not released from each other. The material in the layers is elastic, and the adhesion between the layers is at least of the same magnitude as the weakest of the materials.

The conductivity of the two semiconducting layers is sufficient to substantially equalize the potential along each layer. The conductivity of the outer semiconducting layer is sufficiently large to contain the electrical field in the cable, but sufficiently small not to give rise to significant losses due to currents induced in the longitudinal direction of the layer.

Thus, each of the two semiconducting layers essentially constitutes one equipotential surface, and these layers will substantially enclose the electrical field between them.

There is, of course, nothing to prevent one or more additional semiconducting layers being arranged in the insulating layer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
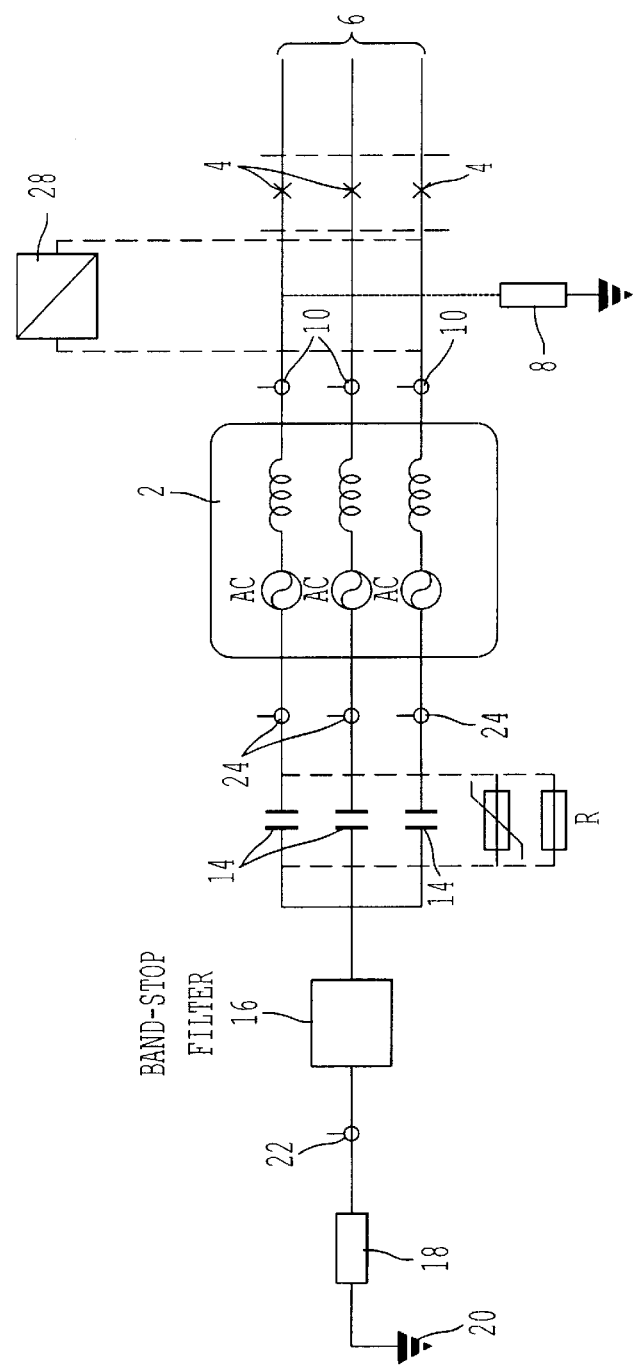
FIG. 1 is a schematic diagram of one embodiment of the present invention.

FIG. 1 shows an alternating current machine 2 in the form of a generator, the phase voltages of which are connectedly directly to the network 6 via isolators and breakers 4.

Over-voltage protection means 8 and current measuring devices 10 are also provided on the output side of the generator 2.

The stator winding of the generator 2 is Y-connected and a series-compensation capacitor 14 is connected in each of the phases on the down side of the winding. A bandstop filter 16 is connected to the Y-point of the capacitor bank and a neutral-point resistor 18 is connected to the earth point 20 of the network 6. Current measuring devices 22, 24 are also provided on this side of the generator 2.

Connecting a series capacitor 14 in each of the phases achieves series compensation of the alternating current machine 2, thereby lowering the system reactance.

Over-voltage protection means 26 and a resistance R are suitably provided in order to protect the capacitors 14 in the event of a fault condition.

The filter 16 has nothing directly to do with the invention and will not be described in more detail.

The neutral-point resistor 18 is dimensioned to limit earth faults to a harmless magnitude of a few tens of amperes. An earth fault in the generator 2 may thus result in an earth-fault current through the resistor 18, and controlling the magnitude of this current enables measures to be taken for disconnecting the generator and possibly the faulty phase.

Alternatively the generator 2 may be connected to the network via a converter 28, as indicated in FIG. 1.

The field excitation of the generator has been omitted in FIG. 1.

Figure 2:
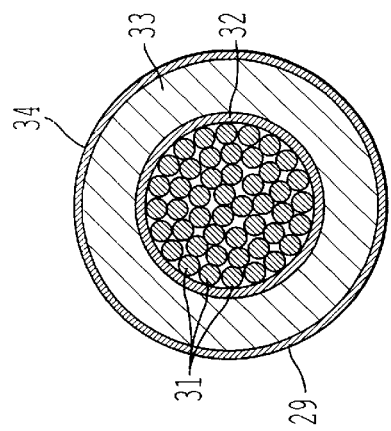
FIG. 2 is a cross section of a high-voltage cable used as a winding in a rotating machine according to the present invention.

FIG. 2 shows a cross section through a high-voltage cable 29 used in the rotating electric machine according to the invention. The high-voltage cable 29 is composed of a number of strand parts 31 made of copper, for instance, and having circular cross section. These strand parts 31 are arranged in the middle of the high-voltage cable 29. Around the strand parts 31 is a first semiconducting layer 32. Around the first semiconducting layer 32 is an insulating layer 33, e.g. XLPE-insulation, and around the insulating layer 33 is a second semiconducting layer 34.

What is claimed is:

1. A method for providing series compensation of a rotating electric alternating current machine connected to a three-phase network for at least one of distribution and transmission, the three-phase network having a fundamental frequency, the rotating electric alternating current machine being one of directly connected to the three-phase network and connected via a static current converter, a stator winding of the rotating electric alternating current machine having three phases Y-connected, comprising the steps of:

connecting a down side of a first phase of the three phases of the stator winding to a first side of a first capacitive circuit;

connecting a second side of the first capacitive circuit to a ground of the three-phase network completing a first series capacitive circuit;

connecting a down side of a second phase of the three phases of the stator winding to a first side of a second capacitive circuit;

connecting a second side of the second capacitive circuit to the ground of the three-phase network completing a second series capacitive circuit;

connecting a down side of a third phase of the three phases of the stator winding to a first side of a third capacitive circuit;

connecting a second side of the third capacitive circuit to the ground of the three-phase network completing a third series capacitive circuit; and lowering a reactance of a system including the rotating electric alternating current machine by compensating the three phases of the stator winding through respective series capacitive circuits.

2. A device for providing series compensation of a rotating electric alternating current machine connected to a three-phase network for at least one of distribution and transmission, the three-phase network having a fundamental frequency, the rotating electric alternating current machine being one of directly connected to the three-phase network and connected via a static current converter, a stator winding of the rotating electric alternating current machine having three phases Y-connected, comprising:

a first capacitive circuit having a first side and a second side, the first side connected to a down side of a first phase of the three phases of the stator winding and the second side connected to a ground of the three-phase network so as to create a first series capacitive circuit;

a second capacitive circuit having a first side and a second side, the first side connected to a down side of a second phase of the three phases of the stator winding and the second side connected to the ground of the three-phase network so as to create a second series capacitive circuit; and a third capacitive circuit having a first side and a second side, the first side connected to a down side of a third phase of the three phases of the stator winding and the second side connected to the ground of the three-phase network so as to create a third series capacitive circuit, wherein the first series capacitive circuit, the second series capacitive circuit, and the third series capacitive circuit are configured to lower a reactance of a system including the rotating electric alternating current machine by compensating the three phases of the stator winding through respective series capacitive circuits.

3. The device of claim 2, wherein:

the first series capacitive circuit includes a first capacitor;

the second series capacitive circuit includes a second capacitor; and the third series capacitive circuit includes a third capacitor.

4. The device of claim 3, further comprising:

means for protecting from over-voltage connected in parallel with the first capacitor;

means for protecting from over-voltage connected in parallel with the second capacitor; and means for protecting from over-voltage connected in parallel with the third capacitor.

5. The device of claim 2, further comprising:

a bandstop filter connected in series between a Y-point and the ground of the three-phase network, the Y-point including the second side of the first capacitive circuit, the second side of the second capacitive circuit and the second side of the third capacitive circuit.

6. The device of claim 5, further comprising a low-ohmic resistor connected in series between the bandstop filter and the ground of the three-phase network.

7. A rotating electric alternating current machine, comprising:

a stator having slots;

a stator winding drawn through the slots of the stator, the stator winding being a high-voltage cable; and a series compensation device having a first capacitive circuit having a first side and a second side, the first side connected to a down side of a first phase of three phases of the stator winding and the second side connected to a ground of a three-phase network so as to create a first series capacitive circuit;

a second capacitive circuit having a first side and a second side, the first side connected to a down side of a second phase of the three phases of the stator winding and the second side connected to the ground of the three-phase network so as to create a second series capacitive circuit; and a third capacitive circuit having a first side and a second side, the first side connected to a down side of a third phase of the three phases of the stator winding and the second side connected to the ground of the three-phase network so as to create a third series capacitive circuit, wherein the three-phase network is for at least one of distribution and transmission, the three-phase network has a fundamental frequency, and the first series capacitive circuit, the second series capacitive circuit, and the third series capacitive circuit are configured to lower a reactance of a system including the rotating electric alternating current machine by compensating the three phases of the stator winding through respective series capacitive circuits.

8. The rotating electric alternating current machine of claim 7, wherein the stator winding comprise s a high-voltage cable having, a core having a plurality of conductive strands, an inner semiconducting layer surrounding the core, an insulating layer surrounding the inner semiconducting layer, and an outer semiconducting layer surrounding the insulating layer.

9. The rotating electric alternating current machine of claim 8, wherein the high-voltage cable has a diameter in an inclusive range of 20 through 200 mm, and a conducting area in an inclusive range of 80 through 3000 mm$^2$.

10. The rotating electric alternating current machine of claim 8, wherein:

the high-voltage cable is flexible, the inner semiconducting layer is in contact with the core, the insulating layer is in contact with the inner semiconducting layer, and the outer semiconducting layer is in contact with the insulating layer.

11. The rotating electric alternating current machine of claim 8, wherein:

the inner semiconducting layer, the insulating layer, and the outer semiconducting layer are configured to have an elasticity and coefficients of thermal expansion such that a change in a volume of the layers caused by a change in temperature is absorbed such that the inner semiconducting layer maintains contact with the core, the insulating layer maintains contact with the inner semiconducting layer, and the outer semiconducting layer maintains contact with the insulating layer.

12. The rotating electric alternating current machine of claim 8, wherein:

the inner semiconducting layer, the insulating layer, and the outer semiconducting layer are configured to have a modulus of elasticity less than 500 MPa.

13. The rotating electric alternating current machine of claim 8, wherein:

the inner semiconducting layer, the insulating layer, and the outer semiconducting layer are configured to have substantially the same coefficient of thermal expansion.

14. The rotating electric alternating current machine of claim 8, wherein:

an adhesion between the layers being at least as strong as a strength of a weakest material in the layers.

15. The rotating electric alternating current machine of claim 8, wherein:

the inner semiconducting layer comprises an equipotential surface, and the outer semiconductor layer comprises an equipotential surface.

16. The rotating electric alternating current machine of claim 8, wherein:

the inner semiconducting layer, the insulating layer, and the outer semiconducting layer are configured to have a modulus of elasticity less than 200 MPa.

* * * * *